(12) United States Patent
Yamada

(10) Patent No.: US 6,782,831 B2
(45) Date of Patent: Aug. 31, 2004

(54) PASSENGER TRANSPORTATION SYSTEM

(75) Inventor: Saburo Yamada, Sakai (JP)

(73) Assignee: Senyo Kogyo Co., Ltd., Os-ka (JP)

( * ) Notice: Subject to any disclaimer, the term of this patent is extended or adjusted under 35 U.S.C. 154(b) by 0 days.

(21) Appl. No.: 10/133,431

(22) Filed: Apr. 29, 2002

(65) Prior Publication Data

US 2003/0200893 A1 Oct. 30, 2003

(51) Int. Cl.$^7$ ................................................. A63G 1/00
(52) U.S. Cl. ................................................ 104/53; 104/60
(58) Field of Search ........................... 104/126, 127, 104/128, 53, 28, 27, 89, 106, 113, 173.1, 173.2, 180, 60, 63, 73

(56) References Cited

U.S. PATENT DOCUMENTS

| | | | | |
|---|---|---|---|---|
| 3,855,936 A | * | 12/1974 | Schwarzkopf | 104/63 |
| 3,889,605 A | * | 6/1975 | Bacon | 104/56 |
| 4,165,695 A | * | 8/1979 | Schwarzkopf | 104/55 |
| 4,961,385 A | * | 10/1990 | Abouzakhm | 104/113 |
| 5,595,121 A | * | 1/1997 | Elliott et al. | 104/53 |
| 6,024,647 A | * | 2/2000 | Bennett et al. | 472/43 |
| 6,158,354 A | * | 12/2000 | Eiraku | 104/53 |
| 6,170,402 B1 | * | 1/2001 | Rude et al. | 104/53 |
| 6,227,120 B1 | * | 5/2001 | Fritz | 104/60 |
| 6,269,750 B1 | * | 8/2001 | Cornwell et al. | 104/53 |
| 6,348,004 B1 | * | 2/2002 | Houben | 472/43 |
| 6,354,223 B2 | * | 3/2002 | McKoy | 104/72 |
| 6,397,756 B1 | * | 6/2002 | Saiko et al. | 104/53 |
| 6,513,441 B1 | * | 2/2003 | Clerx et al. | 104/53 |

FOREIGN PATENT DOCUMENTS

| | | | | |
|---|---|---|---|---|
| GB | 2109252 A | * | 6/1983 | A63G/7/00 |

* cited by examiner

*Primary Examiner*—Frantz F. Jules
(74) *Attorney, Agent, or Firm*—Armstrong, Kratz, Quintos, Hanson & Brooks, LLP

(57) ABSTRACT

A track has an acceleration zone and an inertial running zone. The acceleration zone is to accelerate a car lifted by a lifting apparatus having a stationary power source through a steep down slope. The track is disposed approximately horizontal in the inertial running zone as the car proceeds mainly by inertial running. The car is provided with a seat as to oscillate corresponding to gravity and acceleration of the car. A control device is used to control the oscillation of the seat provided. The seat oscillates corresponding to gravity and acceleration in lifting by the lifting apparatus and in the acceleration zone.

17 Claims, 11 Drawing Sheets

PASSENGER TRANSPORTATION SYSTEM

BACKGROUND OF THE INVENTION

1. Field of the Invention

This invention relates to a passenger transportation system.

As passenger transportation systems for short and medium distance of 5 to 10 km, utmost 20 km, new transportation system and monorail are known.

2. Description of the Related Art

Although there is high demand for the passenger transportation system to link a residential area with a main transportation line, to link plural main transportation lines together, to work as a transportation system within an apartment residential area, to link local airports with city centers, construction of the new transportation system and the monorail above is conducted slower than it was expected.

Because, firstly, construction cost of the new transportation system and the monorail is extremely high, and secondly, their compositions are too complicated and their performances are excessively high.

It is an object of the present invention to provide a passenger transportation system of small scale having simple construction, low construction cost, and appropriate performance for short and medium distance. And, it is another object of the present invention to provide a passenger transportation system having comfortable seats even in climbing and descending, and in acceleration and deceleration.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 5:
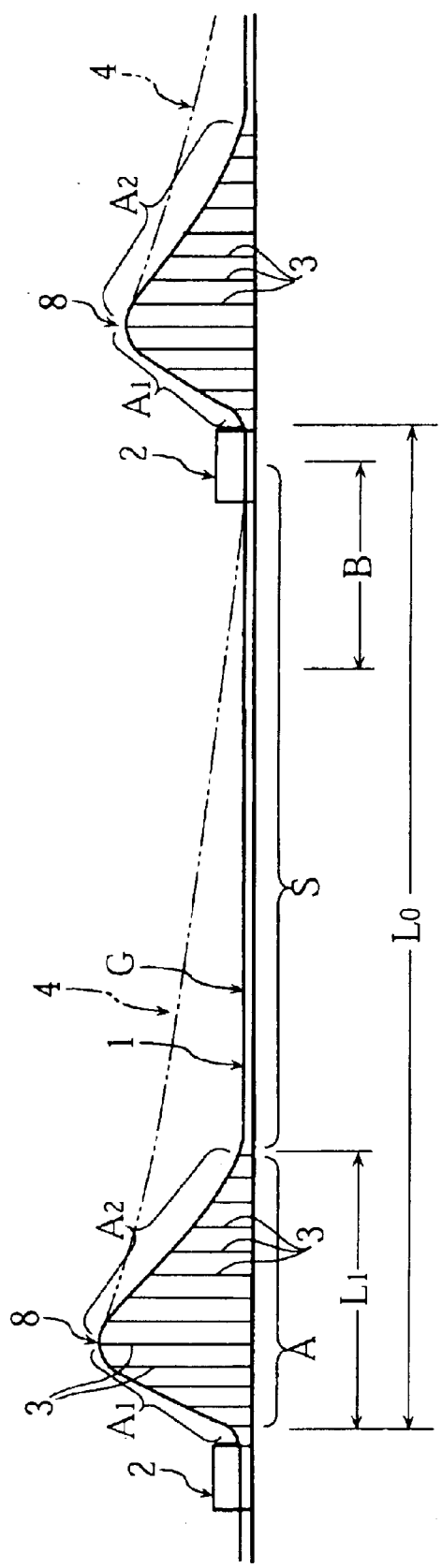
FIG. 5 is a simplified side view of a principal portion.

In FIG. 5, 1 is a track, and 2 indicates a station (platform). The track 1 has an acceleration zone A and an inertial running zone S.

In the acceleration zone A, as shown in FIG. 5, the track 1 is formed into a hill, and the acceleration zone A is composed of a lifting zone $A_1$ in which a train is lifted by a lifting apparatus having a stationary power source (such as a motor with a speed reducer), and a steep inclination zone $A_2$ having a steep down slope.

A ratio (percentage) of a horizontal distance $L_1$ of the acceleration zone A to an interval $L_0$ between the station 2 and another station 2 is set to be 2 to 10%.

Although the track 1 is supported by sufficiently high large supporting legs 3 in the acceleration zone A, the track 1 except in the acceleration zone A is sufficiently close to a ground G and supported by small supporting legs, or touching and disposed on the ground G (without supporting legs).

The above-mentioned lifting apparatus (not shown in Figures) is composed of a chain and a motor with a speed reducer, or, a rope, a winding device, a motor with a speed reducer, and an elevation stage, or a linear motor.

A two-dot broken line 4 in FIG. 5 shows a comparison example. When the track is disposed for a long distance with a gentle slope as the comparison example, many large supporting legs 3 of various length are necessary, the construction cost becomes enormous, the construction becomes complicated, and the construction work is difficult.

On the contrary, with the track 1 of the present invention formed as the continuous line in FIG. 5, the construction work is remarkably easy and the construction cost can be reduced because the large supporting legs are required only for supporting 2 to 10% of the track 1.

The ratio is $2\% \leq (L_1/L_0) \times 100 \leq 10\%$ because if the ratio is lower than the minimum value (2%), the hill of the acceleration zone A is excessively steep as to increase danger, make passengers anxious, and gain insufficient acceleration. And, if the ratio is more than the maximum value (10%), number of the large supporting legs 3 is unnecessarily large, the construction work is made difficult, and the construction cost is increased thereby.

A train is immediately lifted from the position of the station 2 to the lifting zone $A_1$, accelerated through the steep inclination zone (steep down slope) $A_2$ and running to the right side of FIG. 5, inertially running through the approximately horizontal track 1 of the long inertial running zone S without driving, and arrives at next (neighboring) station 2.

Figure 10:
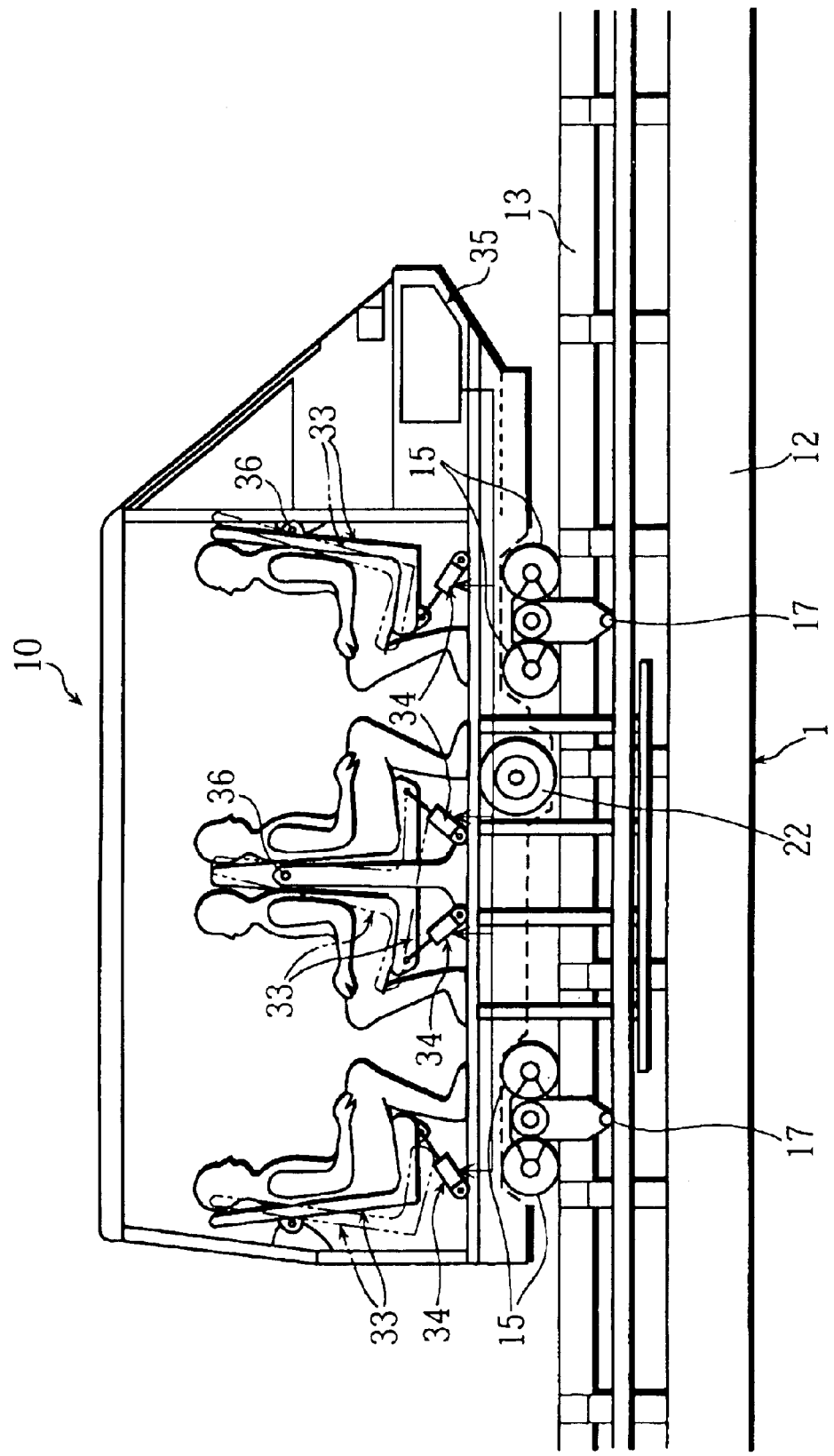
FIG. 10 is a simplified cross-sectional side view.

As shown with continuous lines and imaginary lines in FIG. 10, a car 10 is provided with seats 33 as to oscillate corresponding to gravity and acceleration of the car 10 and a seat position control means 34 (such as a liquid cylinder and a damper) controlling the oscillation of the seat 33. In the lifting by the lifting apparatus and in the acceleration zone A (refer to FIG. 5), the seat 33 oscillates as to vertically support weight of a passenger with its bearing surface continuously.

Figure 11:
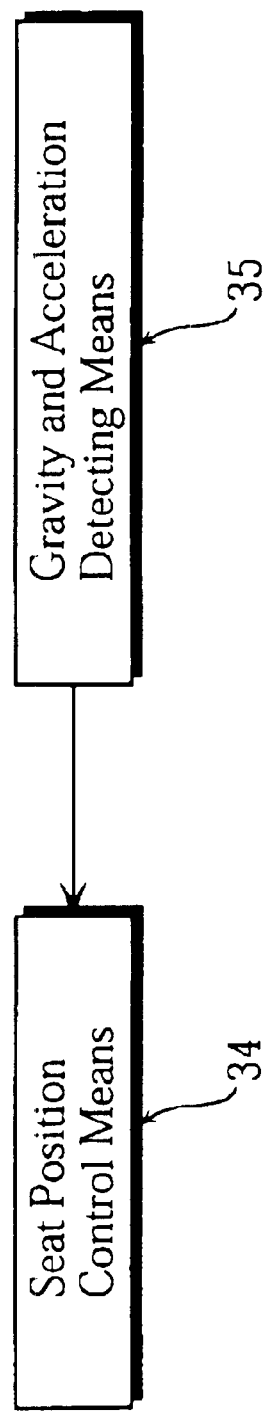
FIG. 11 is a block diagram.

As described above, a seat portion (the bearing surface) and resultant force of gravity and antiacceleration, which is a force in opposite direction to the acceleration and having a magnitude expressed by (mass)×(magnitude of the acceleration), are always at right angles each other. That is to say, as shown in FIG. 11, force working on the passenger is detected by a gravity and acceleration detecting means 35, and the seat 33 is oscillated by the seat position control means 34 as the seat portion of the seat 33 is at right angles with the force. And, it is preferable to make the movement gentle with the above-mentioned damper.

The seat 33 is supported by a supporting point 36 at a position higher than a center of gravity such as the passenger's hip sitting on the seat 33 as to oscillate back and forth. And, the seat 33 in the middle of FIG. 10 is inverted T-shaped formed as a passenger sits on one side (proceeding direction side) facing to the proceeding direction, and another passenger sits on the other side (opposite side to the proceeding direction) facing to the opposite direction to the proceeding direction.

Figure 6:
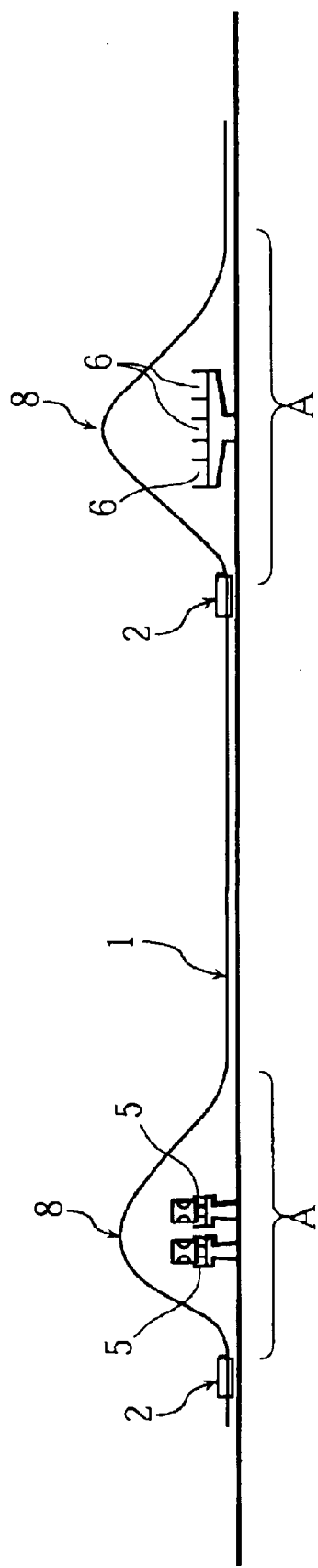
FIG. 6 is a simplified side view showing another embodiment.

Next, FIG. 6 shows the whole of FIG. 5 simplified, and a case that another track 5 or a motorway 6 is disposed as to cross (in top view) with and run below the hill-shaped acceleration zone A. That is to say, the space under the hill-shaped acceleration zone A can be artfully used.

And, collision is prevented by controlling (by a controlling means not shown in Figures) as only one car or one train exists in a section between a top portion 8 of the hill-shaped acceleration zone A and another top portion 8 of a neighboring hill-shaped acceleration zone A.

An example of the car 10 is shown in FIG. 1 through FIG. 4. 11 represents a body, and the car ordinarily runs along the track 1 as a train in which plural cars 10 are connected. The track 1 has a main beam 12, two rails 13 of round pipe each of which is disposed over the main beam 12 on the left side and the right side, and a connecting member 14 disposed with a predetermined pitch as to connect the two rails 13.

The car 10 has upper wheels 15, side wheels 16, and lower wheels 17, which contact each of the rails 13 from upper side, left and right sides, and lower side, and rotate. It can be said that the upper wheel 15 is a main wheel which supports the weight of the car, the side wheel 16 is a side guiding wheel, and the lower wheel 17 is an upstop wheel.

Figure 3:
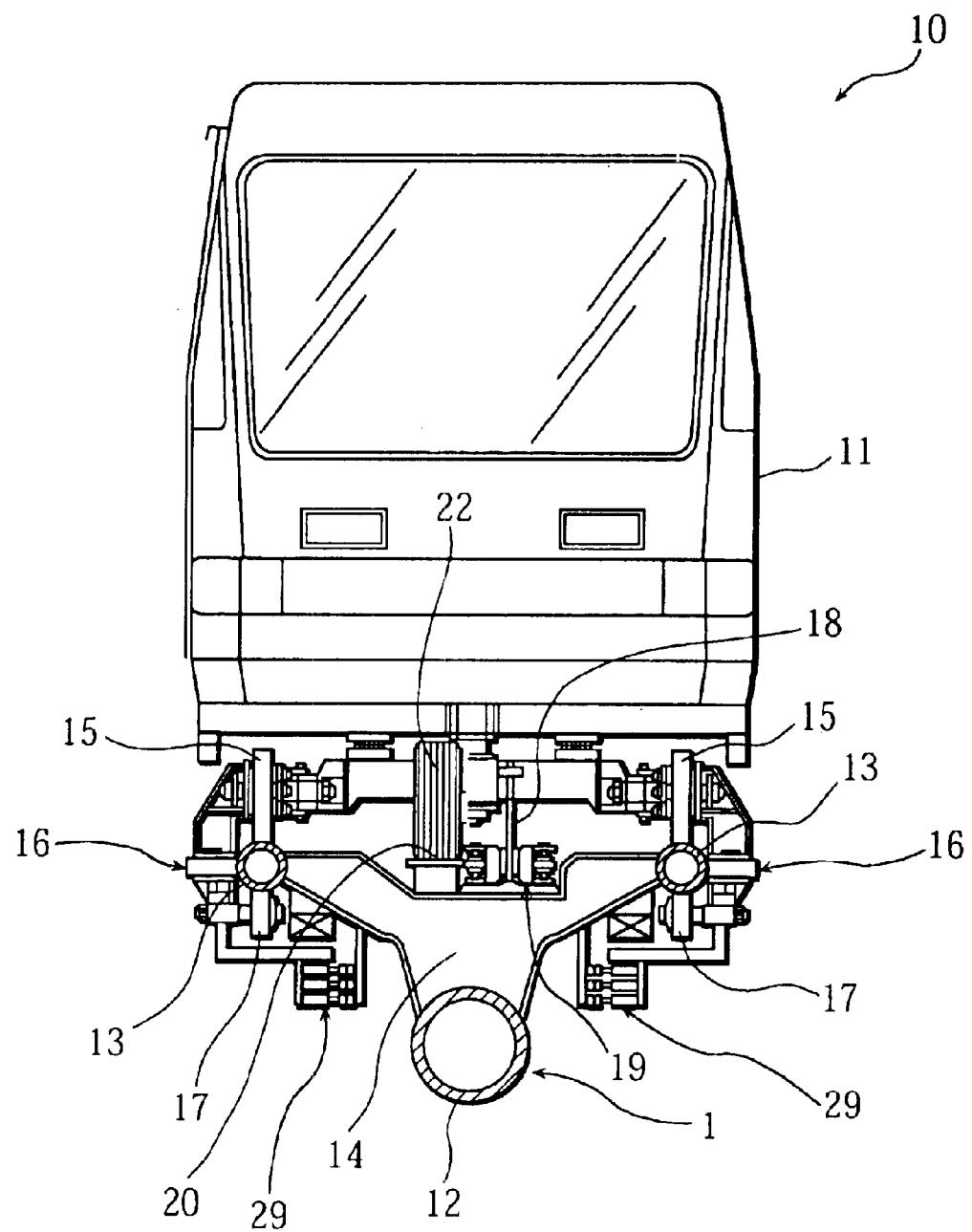
FIG. 3 is a front view with a partial cross-section.
Figure 4:
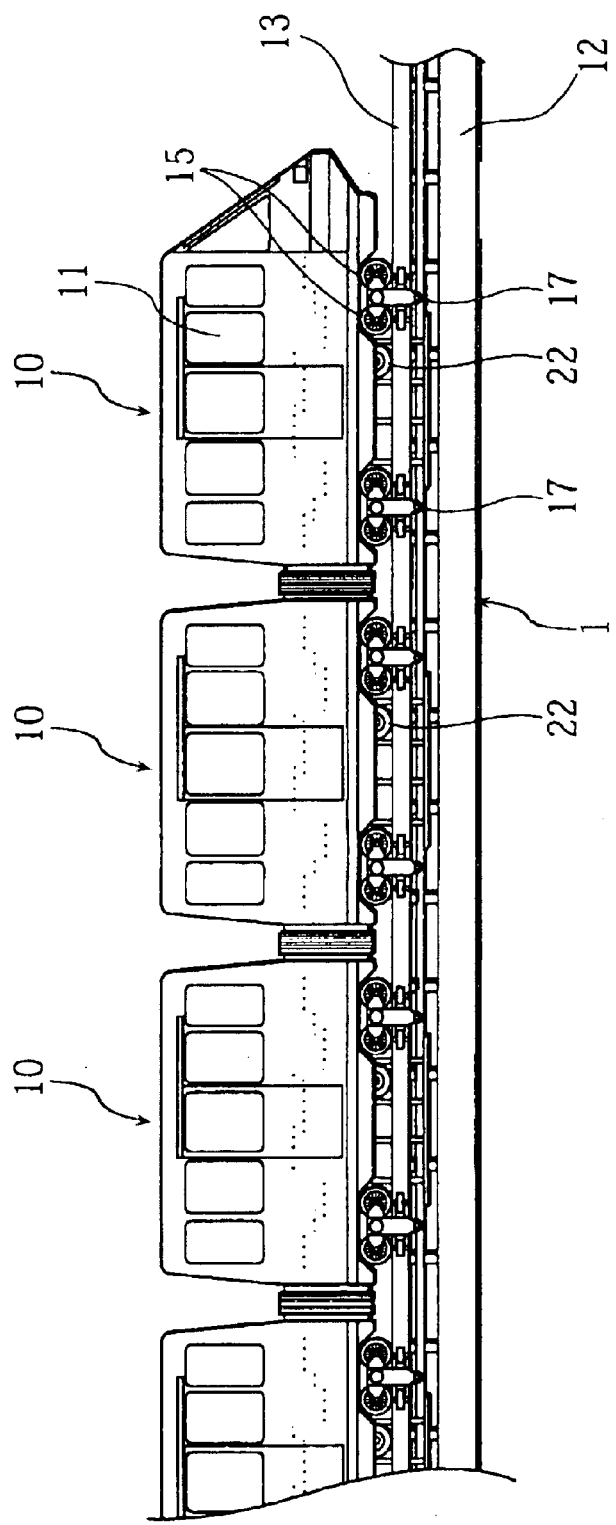
FIG. 4 is a side view.

As shown in FIG. 3, the car 10 has a brake plate 18 vertically, and on the other hand, a braking device 19 having brake pads as to clamp the left and right sides of the brake plate 18 is disposed on the track 1 side.

Figure 7:
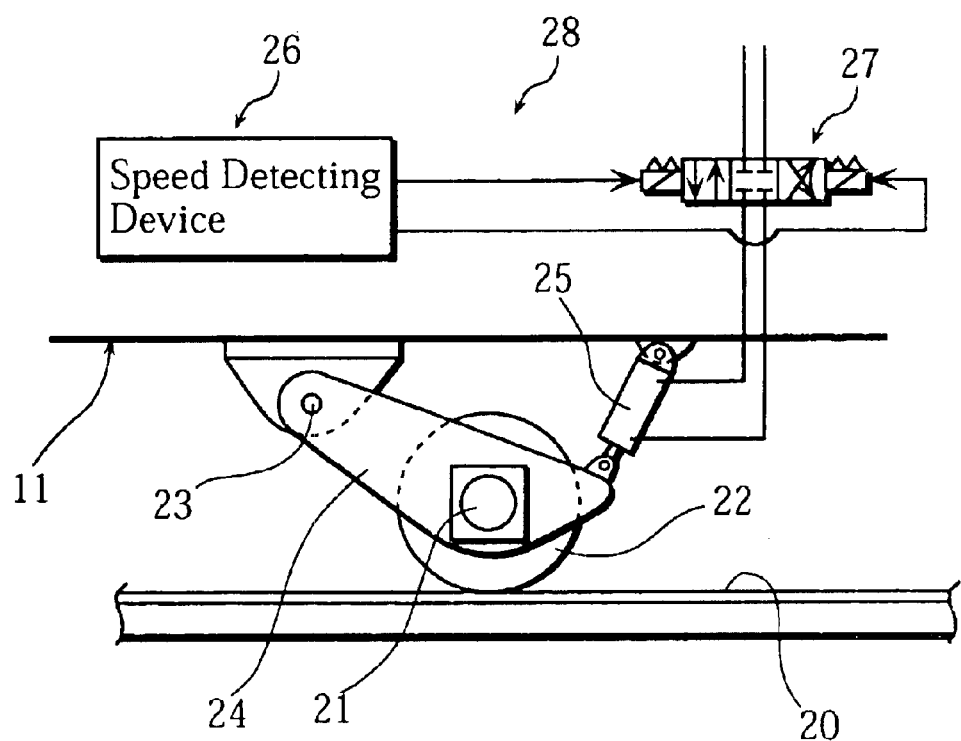
FIG. 7 is an explanatory view of a principal portion.
Figure 8:
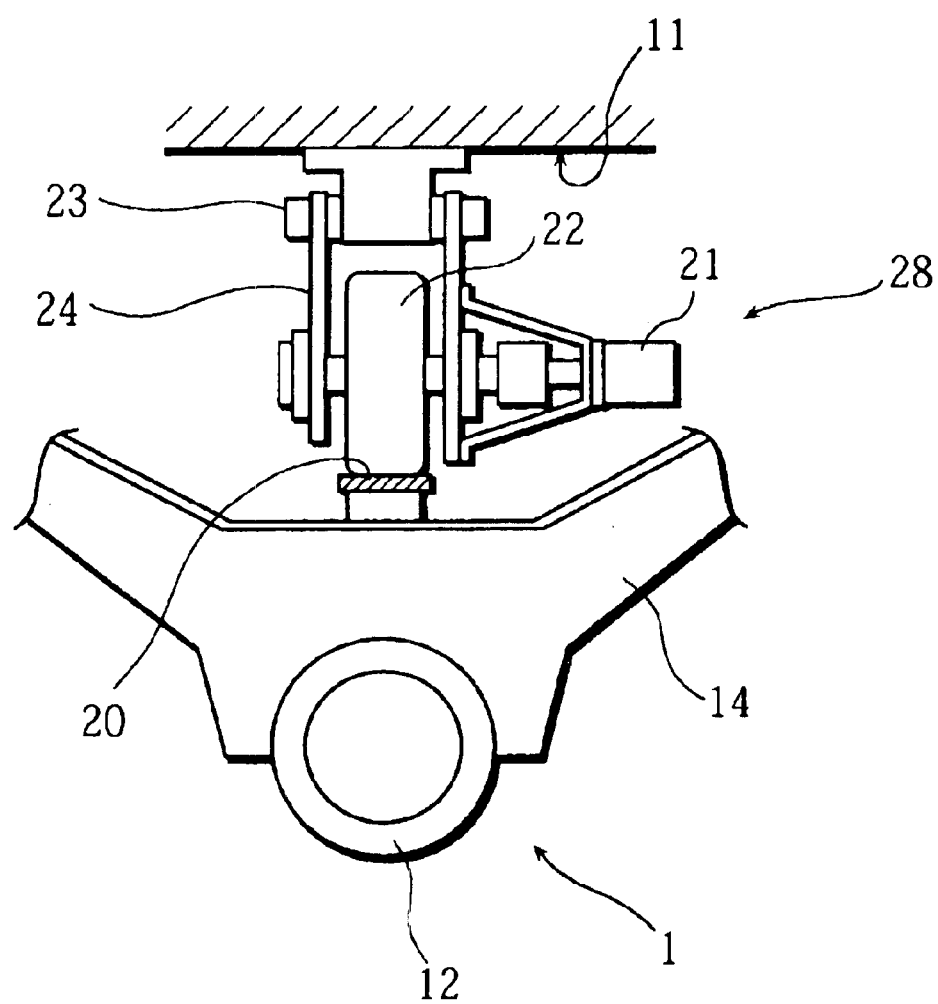
FIG. 8 is a front view of a principal portion.

And, as shown in FIG. 3, FIG. 7, and FIG. 8, a contact face portion 20 (for contact with a driving wheel) is formed with a sheet metal disposed horizontal in longitudinal direction of the track 1, the car 10 is loaded with a small driving motor 21, the driving wheel 22 can be driven to rotate by the small driving motor 21, and the driving wheel 22 freely contacts and parts from the contact face portion 20.

In Figures, an arm 24 is attached to a lower part of the body 11 as to oscillate around a pivot 23, the small driving motor 21 and the driving wheel 22 are attached to the arm 24, and the arm 24 is oscillated by an actuator 25 such as an air cylinder and an oil-hydraulic cylinder as to be pressed to the contact face portion 20 below for driving the car 10.

26 represents a speed detecting device which detects running speed of the car 10 with a pulse signal detector, an encoder, etc. When the running speed becomes lower than a predetermined value, the driving wheel 22 on a raised (parting) position is descended to be pressed to the contact face portion 20 by switching a valve 27, and the car 10 is moved by rotational torque of the driving motor 21. On the contrary, when the running speed goes over the predetermined value, the driving wheel 22 is raised by oppositely switching the valve 27 to part from the contact face portion 20.

Therefore, when the running speed of the car 10 becomes lower than the predetermined value in the inertial running zone S described with FIG. 5, the actuator 25 extends automatically, the arm 24 oscillates downward, and the driving wheel 22 is pressed to the contact face portion 20 on the track 1 side (fixed side) to exceptionally drive the car. For example, the car is driven in an exceptional zone of a range of the mark B in FIG. 5.

Distance and speed of the inertia running of the car 10 after the acceleration in the acceleration zone A depend on weather, number of passengers, and gentle slopes in some cases. In these cases, a small driving means 28 on the car 10 side as shown in FIG. 7 and FIG. 8 is effective.

It is also preferable to use the small driving means 28 as an auxiliary driving source in departure from the station 2 and climbing slopes. And, as a braking means in the station 2, the driving motor 21 can be provided with a brake (not shown in Figures), or the driving wheel 22 can be provided with a brake.

In FIG. 3, 29 represents an electric feeding apparatus which is disposed along the track 1. Collecting electrodes on the car 10 side contact the electric feeding apparatus 29 for electric feeding.

Figure 9:
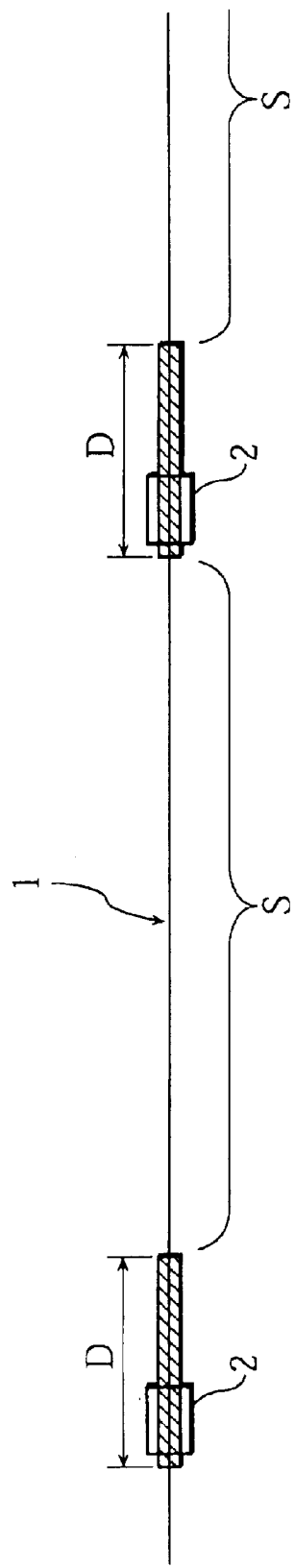
FIG. 9 is a front view showing still another embodiment.

FIG. 9 shows another embodiment. In FIG. 9, a feeding acceleration zone D is disposed on only a part of the track 1, for example, only near the station 2, and the electric feeding apparatus 29 on the ground side is disposed only in the feeding acceleration zone D. With this construction, the feeding apparatus 29 on the ground (the track 1) side is required only for a short distance, and the construction work can be made easy and the construction cost can be reduced.

And, using FIG. 9, still another embodiment is mentioned. A linear motor is disposed only in the zone D to make a linear motor acceleration zone D and the rest of the track 1 remains as the inertial running zone S. It is also preferable to make the construction work easy and reduce the construction cost with this embodiment.

And, (although not shown in Figures) in the passenger transportation system, it is preferable that the track 1 are successively sectioned, when a car 10 is detected by a detector in one of the sections, a electricity-cutting safety controlling means certainly prevents a collision by cutting electric feeding in the next section, and, if necessary, several sections neighboring the section to stop another car 10. In this case, the electric feeding apparatus is disposed along the whole of the track 1, and ON-OFF control is independently conducted in each of the sections.

Figure 1:
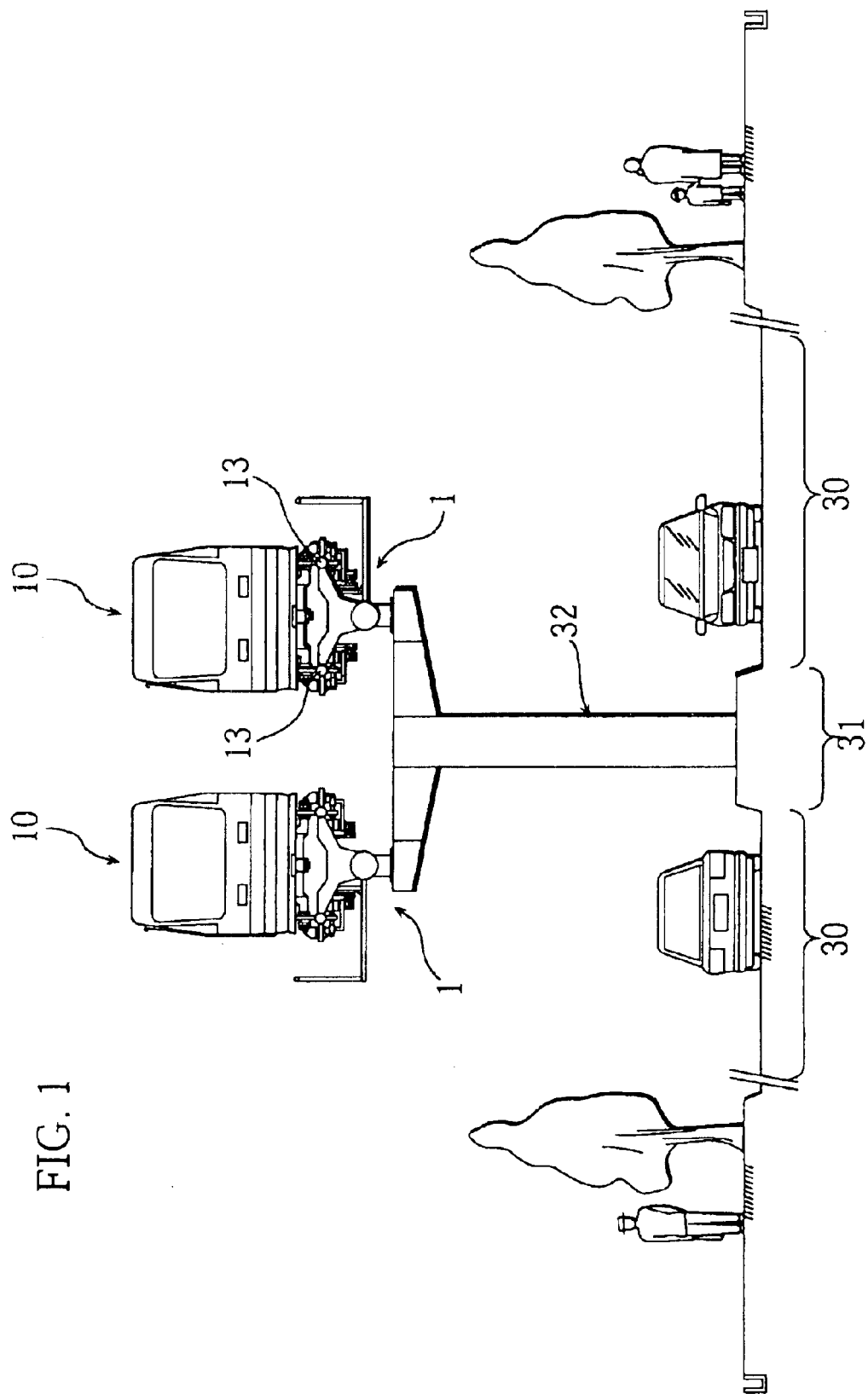
FIG. 1 is a front view showing a preferred embodiment of the present invention.
Figure 2:
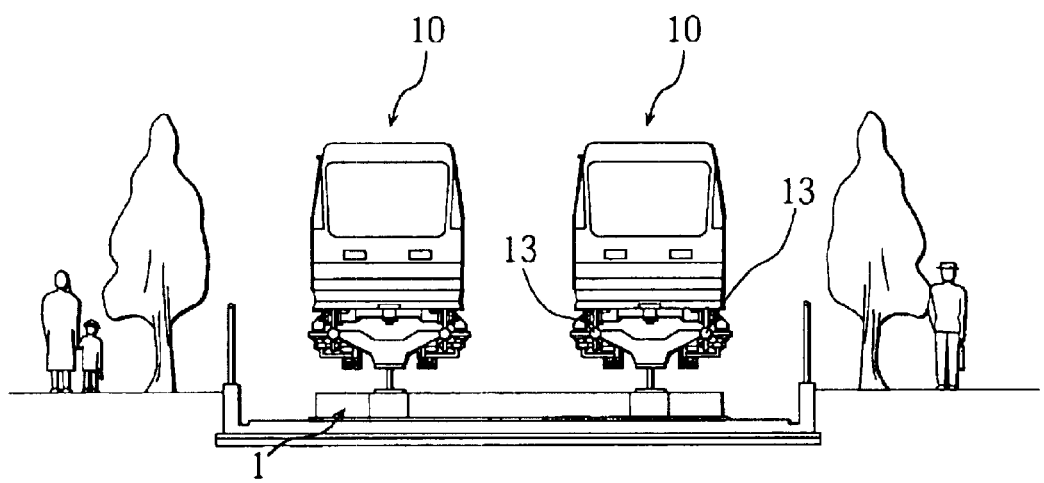
FIG. 2 is a front view showing another place for the embodiment of the present invention.

To add explanations with FIG. 1 and FIG. 2, the passenger transportation system relating to the present invention is easily applied to a built-up road. That is to say, as shown in FIG. 1, a track 1 of round pipe is supported by a supporting leg 32 on a built-up road 30, a median strip 31 of the road 30, and a roadside. With this construction, built-up roads are effectively used, traffic congestion on the roads is alleviated, construction site can be especially small, and the construction cost can be reduced.

The passenger transportation system relating to the present invention, having the construction described above, is a safe and comfortable passenger transportation, environment-friendly, effective for saving energy, having low construction cost, and appropriate for short and medium distance. And, as shown in FIG. 1 through FIG. 3, the passenger transportation system is excellent in safety without derailment for the upper wheel 15, the side wheel 16, and the lower wheel 17 embracing the rail 13 of round pipe. And, when the upper wheel 15, the side wheel 16, and the lower wheel 17 are made of elastic material such as rubber, running noise is hardly generated with the inertial running zone S of long distance, and this contributes to reducing traffic noise. And, a linear motor can be used for the lifting zone $A_1$.

According to the passenger transportation system relating to the present invention, the system is small-scale with a simple construction and having low construction cost, and appropriate performance for short and medium distance is obtained without overperformance. Especially, the car can be lightweight to contribute to saving energy and resource, and running noise is hardly generated.

And, although the car 10 having a small and lightweight construction may not gain sufficient speed depending on conditions such as weather and number of passengers, the car 10 is exceptionally accelerated by the small driving motor to perform smooth transportation.

The track 1 is supported by the large supporting legs 3 not for a long distance as indicated with the two-dot broken line 4 in FIG. 5 but for a range of 2 to 10%. This makes the construction work easy and reasonably reduces the construction cost. And, the passengers can taste some excitement.

And, the passenger transportation system is reasonable as a simple transportation means of small scale, electric feeder is not necessary for long-distance but only for the minimum length. This makes the system excellent in easy construction and reducing the construction cost.

The hill-shaped acceleration zone A is reasonable to give sufficient potential energy to the car 10, and the construction site is efficiently used with another track 5 and the motorway 6 going through the acceleration zone A.

And, collision is certainly prevented to enhance safety further.

And, derailment is effectively prevented to improve safety. The track can be easily disposed on built-up roads.

And, especially in the lifting (climbing) by the lifting apparatus, the seat oscillates as the seat portion is kept horizontal, the passenger can keep a comfortable posture (without pain). And, sitting comfort is obtained because the seat 33 oscillates and inclines corresponding to acceleration and deceleration as the weight of the passenger works vertically on the bearing face.

While preferred embodiments of the present invention have been described in this specification, it is to be understood that the invention is illustrative and not restrictive, because various changes are possible within the spirit and indispensable features.

What is claimed is:

1. A passenger transportation system comprising;
    a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, in which a car is lifted by a lifting apparatus having a stationary power source and accelerated through a steep down slope in the first acceleration zone and the second acceleration zone, wherein the track is not in the form of a loop and a station of said first, second and third stations for boarding passengers is not the same station as de-boarding passengers and wherein the first, second and third stations are different stations.

2. The passenger transportation system as set forth in claim 1, wherein the car is loaded with a small driving motor, a driving wheel driven to rotate by the small driving motor is pressed to a contact face portion disposed along the track when running speed of the car becomes lower than a predetermined running speed as to exceptionally driving the car in a part of the first and second inertial running zones.

3. The passenger transportation system as set forth in claim 1, wherein a ratio of the horizontal distance of the first acceleration zone, composed of a lifting zone in which the car is lifted by the lifting apparatus having a stationary power source and a steep inclination zone having a steep down slope, to an interval between a first station and the second station is set to be 2% to 10%, the track in the first and second acceleration zone is supported by large supporting legs, and the track out of the first and second acceleration zone is supported by small supporting legs, or touching and disposed on the ground without supporting legs.

4. The passenger transportation system as set forth in claim 1 or claim 3, wherein the track is formed into a hill in the first acceleration zone and another track or a motorway is disposed below the acceleration zone formed into the hill as to be crossed with the track.

5. The passenger transportation system as set forth in claim 1 or claim 3, wherein the track is formed into a hill in the acceleration zone, and collision is prevented by controlling as only one car or one train exists in a section between a top portion of the hill-shaped first acceleration zone and another top portion of the neighboring hill-shaped second acceleration zone.

6. A passenger transportation system comprising;
    a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, wherein the first and second acceleration zone is where a car is accelerated and the first and second inertial running zone the car inertially runs without driving, wherein the track is not in the form of a loop and a station of said first, second and third stations for boarding passengers is not the same station as de-boarding passengers and wherein the first, second and third stations are different stations.

7. A passenger transportation system comprising a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, in which a car is lifted by a lifting apparatus having a stationary power source and accelerated through a steep down slope in the first and second acceleration zone, the track is disposed approximately horizontal as the car proceeds mainly by inertial running in the first and second inertial running zone, the car is provided with at least one seat as to oscillate corresponding to gravity and acceleration of the car and a control means to control the oscillation of the seat, and the seat oscillates corresponding to gravity and acceleration in lifting by the lifting apparatus and in the first and second acceleration zone, wherein the track is not in the form of a loop and a station of said first, second and third stations for boarding passengers is not the same station as de-boarding passengers and wherein the first, second and third stations are different stations.

8. The passenger transportation system as set forth in claim 7, wherein the car is loaded with a small driving motor, a driving wheel driven to rotate by the small driving motor is pressed to a contact face portion disposed along the track below a predetermined running speed as to exceptionally driving the car in a part of the first and second inertial running zone.

9. The passenger transportation system as set forth in claim 7, wherein a ratio of the horizontal distance of the first and second acceleration zone, composed of a lifting zone in which the car is lifted by the lifting apparatus having a stationary power source and a steep inclination zone having a steep down slope, to an interval between first station and the second station is set to be 2% to 10%, the track and the first and second acceleration zone is supported by large supporting legs, and the track out of the first and second acceleration zone is supported by small the supporting legs, or touching and disposed on the ground without supporting legs.

10. The passenger transportation system as set forth in claim 7 or claim 9, wherein the track is formed into a hill in the first and second acceleration zone as another track or a motorway is disposed below the first and second acceleration zone formed into the hill as to be crossed with the track.

11. The passenger transportation system as set forth in claim 7 or claim 9, wherein the track is formed into a hill in the first and second acceleration zone, and collision is prevented by controlling as only one car or one train exists in a section between a top portion of the hill-shaped first acceleration zone and another top portion of the hill-shaped second acceleration zone.

12. A passenger transportation system comprising a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track in which the first acceleration zone and second acceleration zone in which a car is accelerated and the rest of the track is formed by the first and second inertial running zone in which the car inertially runs without an internal driving force, in which the car is provided with at least one seat to oscillate corresponding to gravity and acceleration of the car and a control means to control the oscillation of the seat, wherein the track is not in the form of a loop and a station of said first, second and third stations for boarding passengers is not the same station as de-boarding passengers and wherein the first, second and third stations are different stations.

13. The passenger transportation system recited in claims 1, 6, 7 or 12 wherein:
said track is provided with two rails of round pipe, and a car having upper wheels, side wheels, and lower wheels which rotate and contact each of the rails from an upper side, left and right sides, and a lower side.

14. A passenger transportation system comprising:
a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, in which a car is lifted by a lifting apparatus having a stationary power source and accelerated through a steep down slope in the first acceleration zone and the second acceleration zone, wherein a station of said first, second and third stations for boarding passengers is not the same station as de-boarding passengers and wherein the first, second and third stations are different stations.

15. A passenger transportation system comprising;
a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, wherein the first and second acceleration zone is where a car is accelerated and the first and second inertial running zone the car inertially runs without driving, wherein a station of said first, second and third stations for boarding passengers is not the same station as de-boarding passengers and wherein the first, second and third stations are different stations.

16. A passenger transportation system comprising a track having a plurality of stations for boarding and de-boarding passengers, a first acceleration zone and a first inertial running zone located between a first station and a second station of the plurality of stations on the track, a second acceleration zone and a second inertial running zone located between the second station and a third station of the plurality of stations on the track, in which a car is lifted by a lifting apparatus having a stationary power source and accelerated through a steep down slope in the first and second acceleration zone, the track is disposed approximately horizontal as the car proceeds mainly by inertial running in the first and second inertial running zone, the car is provided with at least one seat as to oscillate corresponding to gravity and acceleration of the car and a control means to control the oscillation of the seat, and the seat oscillates corresponding to gravity and acceleration in lifting by the lifting apparatus and in the first and second acceleration zone, wherein a station of said first, second and third stations for boarding passengers is not the same station as de-boarding passengers and wherein the first, second and third stations are different stations.

17. A passenger transportation system comprising a track having a plurality of stations for boarding and dc-boarding passengers, a first acceleration zone and a first inertial running zone located between a first station and a second station of the plurality of stations on the track, a second acceleration zone and a second inertial running zone located between the second station and a third station of the plurality of stations on the track in which the first acceleration zone and second acceleration zone in which a car is accelerated and the rest of the track is formed by the first and second inertial running zone in which the car inertially runs without an internal driving force, in which the car is provided with at least one seat to oscillate corresponding to gravity and acceleration of the car and a control means to control the oscillation of the seat, wherein a station of said first, second and third stations for boarding passengers is not the same station as de-boarding passengers and wherein the first, second and third stations are different stations.

* * * * *